(12) United States Patent
Rabe et al.

(10) Patent No.: US 9,284,199 B2
(45) Date of Patent: Mar. 15, 2016

(54) FLOTATION UNIT FOR PURIFYING WATER, SUCH AS A CFU (COMPACT FLOTATION UNIT)

(75) Inventors: Karsten Rabe, Porsgrunn (NO); Lars Hardli, Porsgrunn (NO)

(73) Assignee: Schlumberger Norge AS, Stavanger (NO)

( * ) Notice: Subject to any disclaimer, the term of this patent is extended or adjusted under 35 U.S.C. 154(b) by 480 days.

(21) Appl. No.: 13/640,719

(22) PCT Filed: Apr. 8, 2011

(86) PCT No.: PCT/IB2011/051527
§ 371 (c)(1),
(2), (4) Date: Mar. 25, 2013

(87) PCT Pub. No.: WO2011/128824
PCT Pub. Date: Oct. 20, 2011

(65) Prior Publication Data
US 2013/0207283 A1  Aug. 15, 2013

(30) Foreign Application Priority Data
Apr. 12, 2010 (DK) ................................ 2010 70142

(51) Int. Cl.
| | | |
|---|---|---|
| *C02F 1/24* | (2006.01) | |
| *B01D 17/02* | (2006.01) | |
| *B01F 5/04* | (2006.01) | |
| *B03D 1/14* | (2006.01) | |
| *B03D 1/24* | (2006.01) | |
| *C02F 101/32* | (2006.01) | |

(52) U.S. Cl.
CPC .............. *C02F 1/24* (2013.01); *B01D 17/0205* (2013.01); *B01D 17/0217* (2013.01); *B01F 5/0428* (2013.01); *B03D 1/1412* (2013.01); *B03D 1/1493* (2013.01); *B03D 1/247* (2013.01); *C02F 2101/32* (2013.01)

(58) Field of Classification Search
CPC ....................................................... C02F 1/24
USPC ............................................................ 261/74
See application file for complete search history.

(56) References Cited

U.S. PATENT DOCUMENTS

| | | | |
|---|---|---|---|
| 4,477,341 A * | 10/1984 | Schweiss et al. ............. | 209/170 |
| 2004/0251566 A1 | 12/2004 | Kozyuk | |

FOREIGN PATENT DOCUMENTS

| | | | |
|---|---|---|---|
| EP | 1783101 A1 * | 5/2007 | |
| GB | 2108858 A | 5/1983 | |
| WO | 96/16743 A1 | 6/1996 | |
| WO | 2007/049245 A2 | 5/2007 | |

OTHER PUBLICATIONS

P. lohn, "Development of agitatorless flotation cells/Zur Entwicklung der ruhrerlosen Flotationszellen/", Aufbereitungs Technik, Verlag Fuer Aufbereitung, Weisbaden, DE, vol. 5, No. 10, pp. 532-543.
International search report for the equivalent PCT patent application No. PCT/IB11/051527 issued on Jul. 25, 2011.

\* cited by examiner

*Primary Examiner* — Duane Smith
*Assistant Examiner* — Adam W Bergfelder
(74) *Attorney, Agent, or Firm* — Cameron R. Sneddon

(57) ABSTRACT

A flotation unit for purifying water, comprising at least a separator tank, a supply duct to a tank inlet, outlets for gas, oil and water from the tank, and a gas injector located in the supply duct, said gas injector comprising a venturi section having an inner diameter and a cross-sectional area smaller than a cross-sectional area of the supply duct, an ejector arranged in the venturi section and having an outer side facing an inside surface of the venturi section, an inner side facing a longitudinal center axis of the venturi section, a downstream side, and a upstream side, the ejector comprising an annular gas distribution chamber and a plurality of gas outlets arranged along a side of the ejector and connected to the gas distribution chamber, and a gas inlet for supplying gas to the gas distribution chamber, wherein the ejector has an outer diameter which is smaller than the inner diameter of the venturi section.

11 Claims, 7 Drawing Sheets

FLOTATION UNIT FOR PURIFYING WATER, SUCH AS A CFU (COMPACT FLOTATION UNIT)

The present invention relates to a flotation unit for purifying water, such as a CFU (compact flotation unit), comprising at least a separator tank, a supply duct to a tank inlet, outlets for gas, oil and water from the tank, and a gas injector located in the supply duct, said gas injector comprising:

a venturi section having an inner diameter and a cross-sectional area smaller than a cross-sectional area of the supply duct, and an ejector arranged in the venturi section and having an outer side facing an inside surface of the venturi section, an inner side facing a longitudinal centre axis of the venturi section, a downstream side, and a upstream side, the ejector comprising an annular gas distribution chamber and a plurality of gas outlets arranged along a side of the ejector and connected to the gas distribution chamber, and a gas inlet for supplying gas to the gas distribution chamber.

Moreover, the invention relates to a method for purifying water.

Flotation units of the above type are used is oil production facilities for separating mixtures containing water, oil and gas into discrete, vertically spaced water, oil, and gas layers in a separator tank. An example of such a unit is known from WO2007/049245.

This flotation unit works very well, being effective and highly reliable, but due to the ever increasing demands, particularly from the offshore industry, it is a desire to achieve an even better separation.

It is an object of the present invention to provide a flotation unit that performs even more effectively, without increasing the need for maintenance.

According to the present invention this is achieved with a flotation unit wherein the ejector has an outer diameter which is smaller than the inner diameter of the venturi section. There is consequently a circumferential flow space between the inside surface of the venturi section and the outer wall of the ejector. The inflowing mixture of water and small amounts of oil and possibly gas is divided at the ejector in a flow through the circumferential flow space outside the ejector and a central flow passing through the ejector. This division of the flow has three major advantages. Firstly, the gas will be ejected into the main flow within the pipe where the velocity of the liquid mixture is high. Secondly, when the two sub-streams come together on the downstream side of the ejector it results in a zone of lower pressure, which helps pulling the gas away from the ejector outlets and distribute it in the liquid mixture. Thirdly, the mixing of the two flows on the downstream side of the ejector helps distributing the gas throughout the flow, and the gas thus has better possibility for picking up any oil droplets present in the water.

The ejector and the venturi section preferably have circular cross-sectional shape, but other shapes such as oval, elliptical or even rectangular are possible. In case the cross-sectional shape is non-circular then the "diameter" is considered to be the diameter of a circle having the same cross-sectional area.

In an embodiment aiming at improving the hydrodynamic properties of the injector the upstream side of the ejector is convex. The term 'convex' is to be understood in a broad sense to cover any non-straight shape projecting in the upstream direction. The upstream side may e.g. follow a smooth curve or include a sharp edge or ridge serving to divide the flow, the primary concern being that the shape should provide only a small hydrodynamic resistance. On the upstream side the inner and outer sides of the ejector may be smoothly curved into the upstream side or into the upstream apex in order to promote laminar flow into the ejector.

Although the downstream side may also be curved and run smoothly into the inner and outer sides of the injector it is preferred that the ejector has sharp edges where its downstream side meets the inner and outer sides. The sharp edges cause the laminar inflow to separate at the edge and turn into turbulent flow, which promotes mixing of gas into the flow.

The outlets are preferably arranged to eject gas in a direction corresponding to the intended flow direction within the venturi section in order to promote an even release of gas into the flow, i.e. an even flow rate of gas. This may be achieved with appropriately shaped outlets on the inner or outer side of the ejector, but since such outlets would inevitably cause more irregular, local turbulence effects in the fluid, it is preferred that the outlets are arranged in the downstream side of the ejector. Arranging the outlets in the downstream side of the ejector has the added advantage that the outlets are located in a zone of low pressure in comparison to the fluid pressure upstream of the ejector. The low pressure can bring the advantage that the gas is effectively sucked out from the gas distribution chamber when the pressure is lower than the gas feeding pressure to the distribution chamber. The ejector may thus have a U-shaped cross-section where the ends of the U arms are interconnected by a straight wall, said straight wall serving as the downstream side of the ejector, but other embodiments are also possible, such as an ejector with a curved downstream side.

The ejector is mounted at a distance from the inside surface of the venturi section and it is preferred that the pipe of the gas inlet also serves as a mount carrying the ejector. It is possible to use a gas inlet of such a length that the ejector is located centrally in (coaxial with) the venture section. It is alternatively possible to mount the ejector offset a distance in relation to the cross-sectional area of the venturi section, and this may be an advantage when the gas outlets are evenly distributed along the annular gas distribution chamber. When the ejector is offset so that the distance between the outer side of the ejector and the inside surface of the venturi section is larger at the gas inlet to the annular chamber than at the side opposite the gas inlet, then the flow velocity will be the largest opposite the gas inlet and the pressure in the flow at the downstream side will thus be lowest at this location, and this lowest pressure will promote an more even release of gas from all gas outlets.

A more even release of gas from the gas outlets may alternatively be obtained by arranging the gas outlets unevenly along the surface of the ejector with a relatively larger area of gas outlets distant from the gas inlet than proximate the gas inlet. The relatively larger area can be obtained by arranging outlets with a closer mutual spacing or by using outlets of a larger area per outlet.

The outlets may be of irregular shape, but preferably they are substantially circular openings in the ejector surface and have an individual diameter in the range of 2 to 8 mm, such as from 2 to 6 mm, preferably from 3 to 4 mm. In principle, the openings should be as small as possible in order to facilitate the distribution of the gas and the formation of the finest possible gas bubbles. Small openings, however, have a tendency to clogging and at present an opening diameter of 2 mm is therefore considered to be the minimum. Too large openings counteract even distribution of gas within the flow, partly because the number of openings becomes smaller with increasing diameter of the individual opening, partly because larger openings cause less pressure loss in the flow across each outlet and consequently the gas flow rate tends to be larger through the outlets located near the gas inlet.

As one alternative to circular openings, the individual outlet may be shaped by a circle superimposed by a rectangle, which has longer sides equal to or slightly larger than a diameter of the circle and shorter sides parallel to a tangent to the gas distribution chamber.

It is presently considered advantageous when the total opening area of the gas outlets is substantially equal to the cross-sectional flow area of the gas inlet. This ensures a low flow resistance and a balance between the supply and the consumption of gas. Alternatively, the total opening areas of the gas outlets may be smaller than the cross-sectional flow area of the gas inlet. However, the total opening areas of the gas outlets may also be larger than the cross-sectional flow area of the gas inlet, but in that case it is advantageous to make use of an uneven distribution of the outlets so that the largest areas are located most distant from the gas inlet.

The distance between the ejector and the tank inlet should preferably be sufficiently long to allow gas to catch up with oil, but as the gas tends to seek upwards and separate from the mixture over time, the distance should be sufficiently short to make sure that such separation does not to any substantial degree occur within the supply duct. It is therefore preferred that the injector is spaced apart from the tank such that the gas outlets of the ejector are located at a distance of from 1 to 10 times the inner diameter of the supply duct from the tank inlet, preferably at a distance of 4 to 7 times the inner diameter of the supply duct, more preferred with at a distance of 5 to 6 times the inner diameter of the supply duct.

The gas consumed by the injector may be supplied from any available source, but in a preferred embodiment the separator comprises a recirculation conduit connecting a tank gas outlet from the tank with the gas inlet of the injector. The re-circulation of gas reduces consumption of gaseous medium from an external source or may even make use of an external source superfluous. When the low pressure on the downstream side of the ejector is sufficiently low and a recirculation conduit is used, it may be possible to dispense with pumps in the recirculation conduit.

The injector of the present invention can be used in a method for purifying water, where a gas is injected into a mixture containing water and oil in a supply duct to a flotation unit, such as a CFU (Compact Flotation Unit), the gas being injected in a venturi section having a smaller cross-sectional area than the supply duct, the gas being admitted to a gas distribution chamber in an ejector and ejected into the mixture via a plurality of outlets, in which method the gas is ejected at a distance from the inner surface of the venturi section so that part of the mixture flows between the ejected gas and the inner surface of the venture section. The gas can be supplied from an external source, such as pressurized bottles of gas, or be supplied via recirculation of gas extracted from a flotation unit, or be supplied via recirculation as mentioned topped up with gas from an external source when there is an insufficiency of re-circulated gas.

Examples of embodiments of the present invention are described in further detail in the following with reference to the highly schematic drawings, in which.

Figure 1:
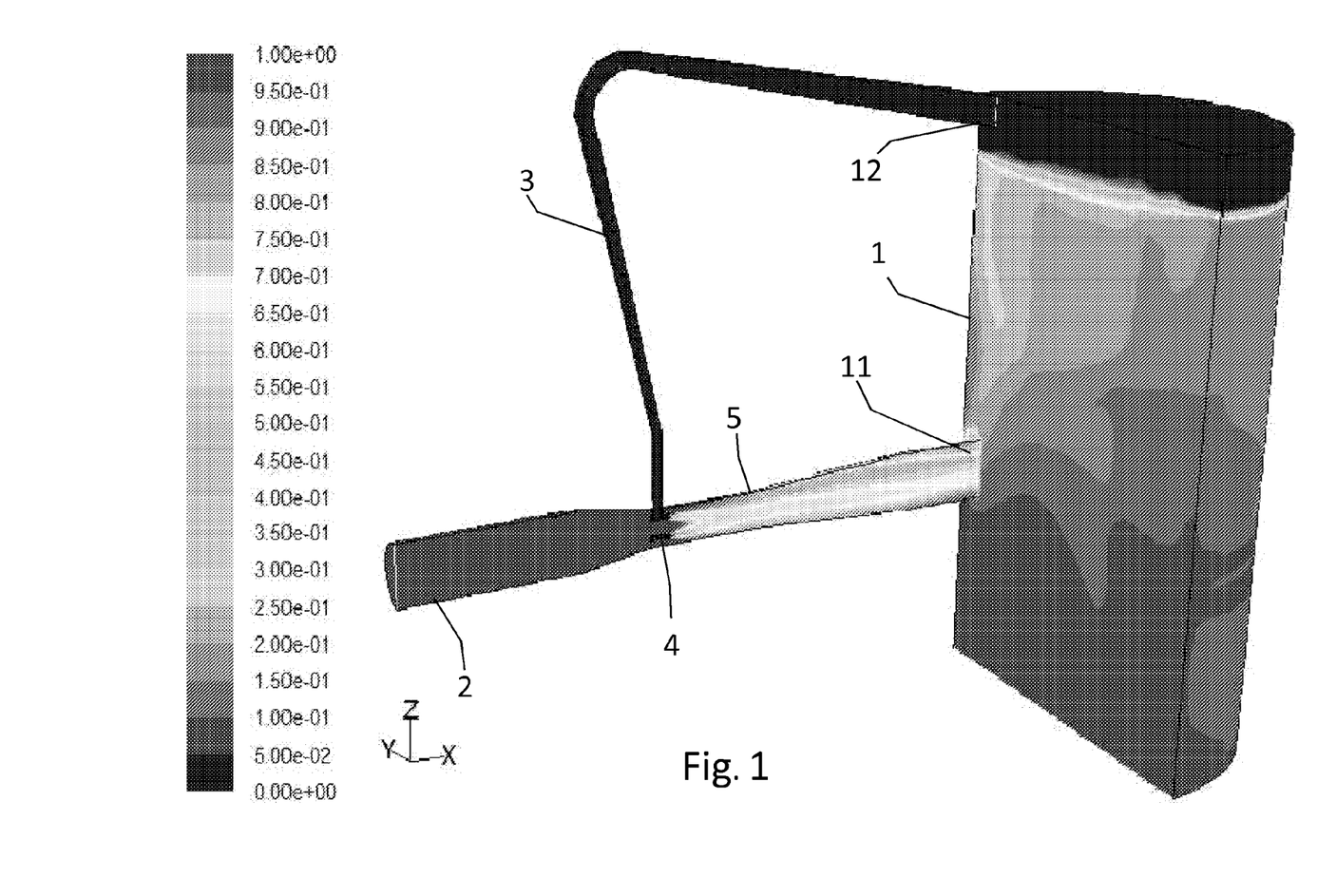
FIG. 1 is a schematic perspective sectional illustration of a flotation unit according to the invention.
Figure 7:
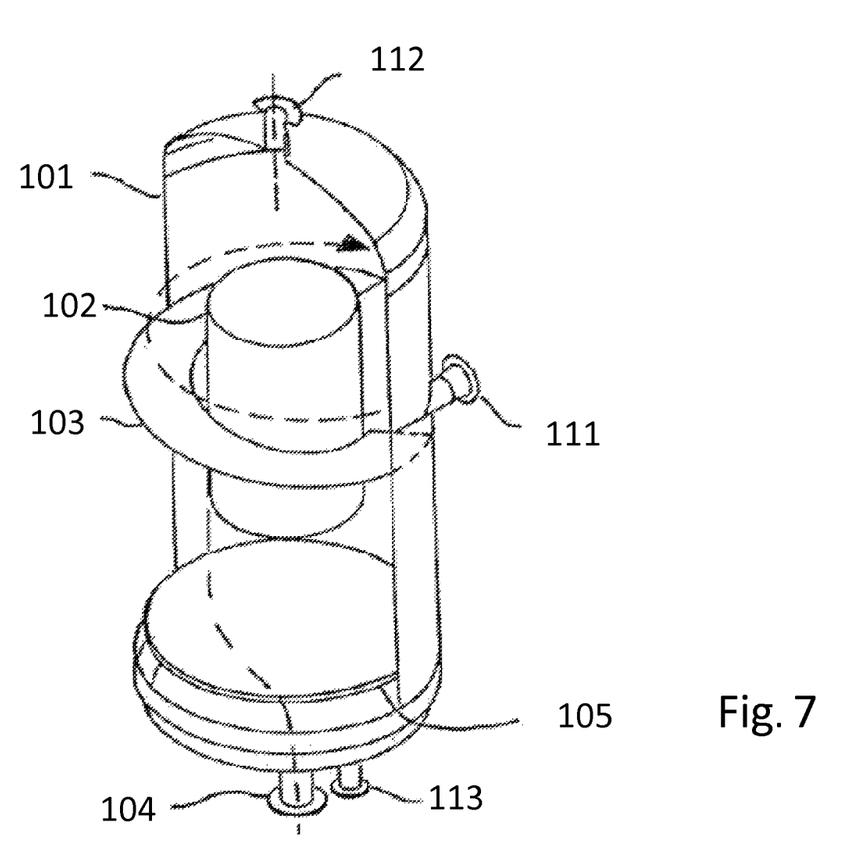
FIG. 7 is one example of the flotation unit illustrated in FIG. 1.
Figure 8:
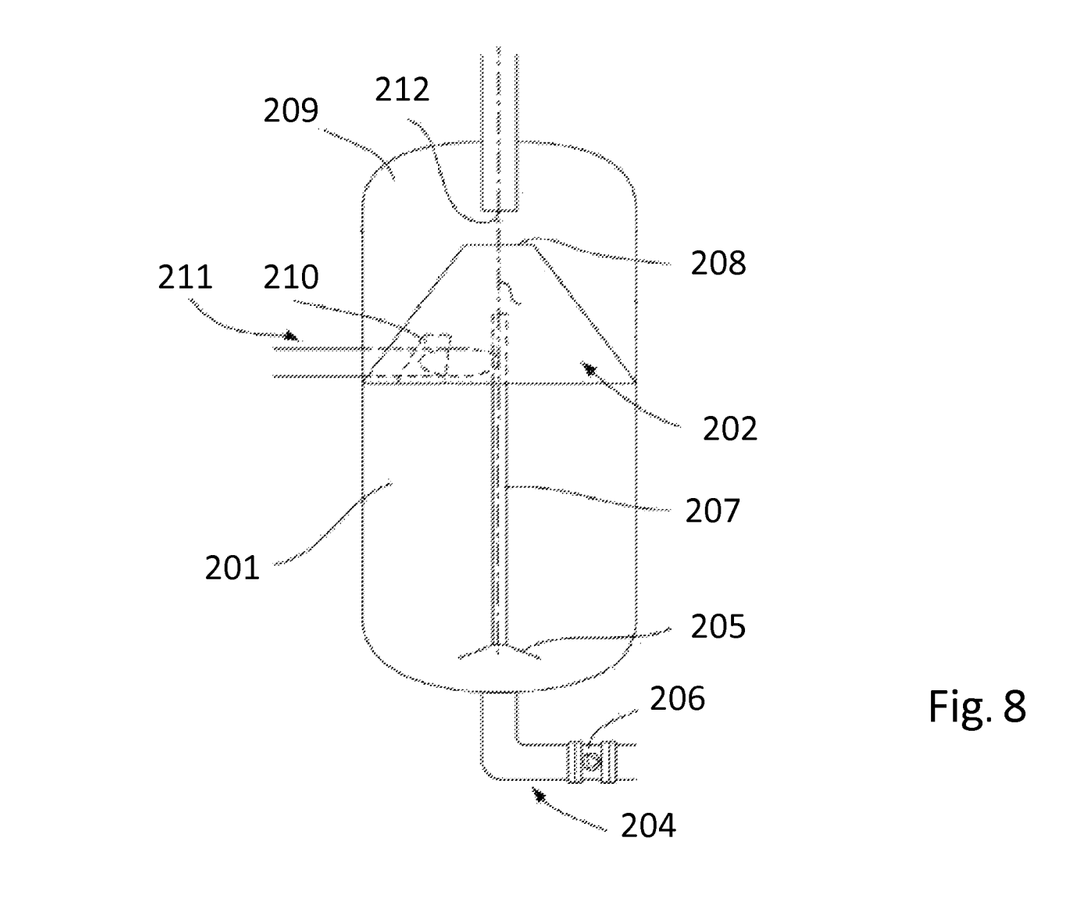
FIG. 8 is another example of the flotation unit illustrated in FIG. 1.

Flotation units of the type shown in FIGS. 1, 7 and 8 also known as CFUs (compact flotation units) are typically used at oil production facilities, particularly at offshore production sites, to separate small amounts of oil from a flow of mainly water, where the liquid mixtures come either directly from a well head communicating with an oil reservoir or diverted as a water phase separated off from such a liquid mixture. Alternatively the flotation unit may be used for purifying processed water in a ship or in an installation where large quantities of water are polluted with small amounts of oil. There is no lower limit for the content of hydrocarbons in the liquid mixture that can be treated with a unit according to the invention. Beside hydrocarbons the water in the mixture may be polluted with non-hydrocarbon gases and solids, such as sand and other minerals.

The flotation units illustrated in FIGS. 1, 7 and 8 comprise a separator tank 1, a supply duct 2 connected to the tank at a tank inlet 11 and a recirculation conduit 3 leading gas from a tank gas outlet 12 in an upper part of the tank to a gas injector 4 arranged in a section of the supply duct. The separator tank, hereinafter called the tank, comprises an oil outlet 112, 212 in the upper part of the tank, a water outlet 104, 204 in the lower part of the tank and possibly a solids outlet 113 in the lower part of the tank. The outlets are provided with valves 206 of which only the valve 204 on the water outlet 204 of FIG. 8 is illustrated. The tank inlet 11, 111, 211 is directed tangentially with respect to the tank so that the incoming fluid is flowing along the tank wall in a swirling motion.

The flotation unit has an inner wall 102, 202 with an upper end opening 208 of smaller diameter than the inner diameter in the tank. The upper end opening 208 is located a distance below the top of the tank so that an upper volume for collection of gas and oil is present above the upper end opening. The inner wall 102, 202 has also a lower end opening located a distanced above the bottom of the tank so that a lower volume is present below the inner wall. During operation a water vortex is swirling in the lower volume. A plate 105, 205 for calming the flow around the water outlet 104, 204 is provided in the lowermost area of the tank. The inner wall is mounted coaxially with the tank and can be circular cylindrical (102 in FIG. 7) or be frusta-conical (202 in FIG. 8). The cylindrical embodiment is associated with a helical guide 103 mounted to the wall of the tank and ending at a radial distance from the outside of the inner wall so that an annular space is present between the inner wall and the guide. The guide extends to below the tank inlet 111 so that the inflow is directed upwards. The guide terminates before it has made one full turn so that a downward flow opening is present between the ends of the guide. The frusta-conical embodiment of the inner wall 202 extends to the wall of the tank and is located just below the tank inlet 111 so that the inflow is flowing along the upper side of the inner wall. The inner wall 202 is provided with downward flow opening 210. During operation a portion of the fluid vortex swirling radial outside the inner wall will pass through the downward flow opening and thus deliver a flow sustaining the vortex swirling in the lower volume of the tank.

Gas injection via the gas injector 4 has the purpose of improving the efficiency of the flotation unit. Gas bubbles catch tiny oil droplets in the water and assist in making the oil droplets agglomerate and coalesce. Within the tank the gas bubbles help the flotation of oil, thus enhancing the separation which occurs naturally due to the differences in density between water and oil. The gas supplied to the gas injector 4 can be supplied from an external source of gas, in which case there is no need for a separate tank gas outlet 12, as the gas can simply exit the tank via the oil outlet 112, 212. The gas can also be re-circulated gas as illustrated in FIG. 1, or the gas supplied to the gas injector can be a recirculated gas supplemented with gas from an external source.

Figures 2, 3:
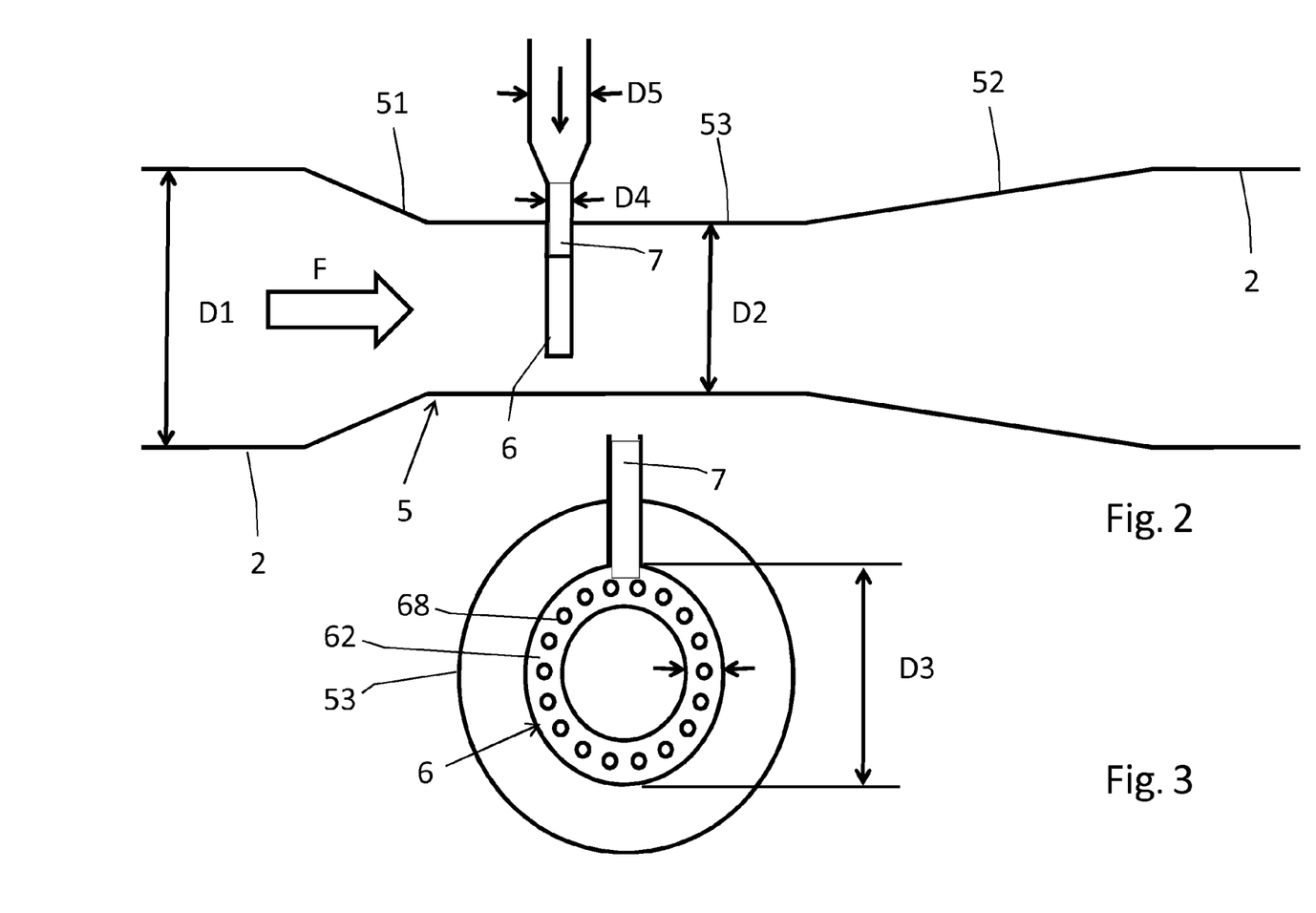
FIG. 2 depicts a schematic sectional view in a longitudinal plane of a supply duct to the flotation unit of FIG. 1.
FIG. 3 is a schematic cross-sectional view through a venture section of the supply duct of FIG. 2.
Figure 4:
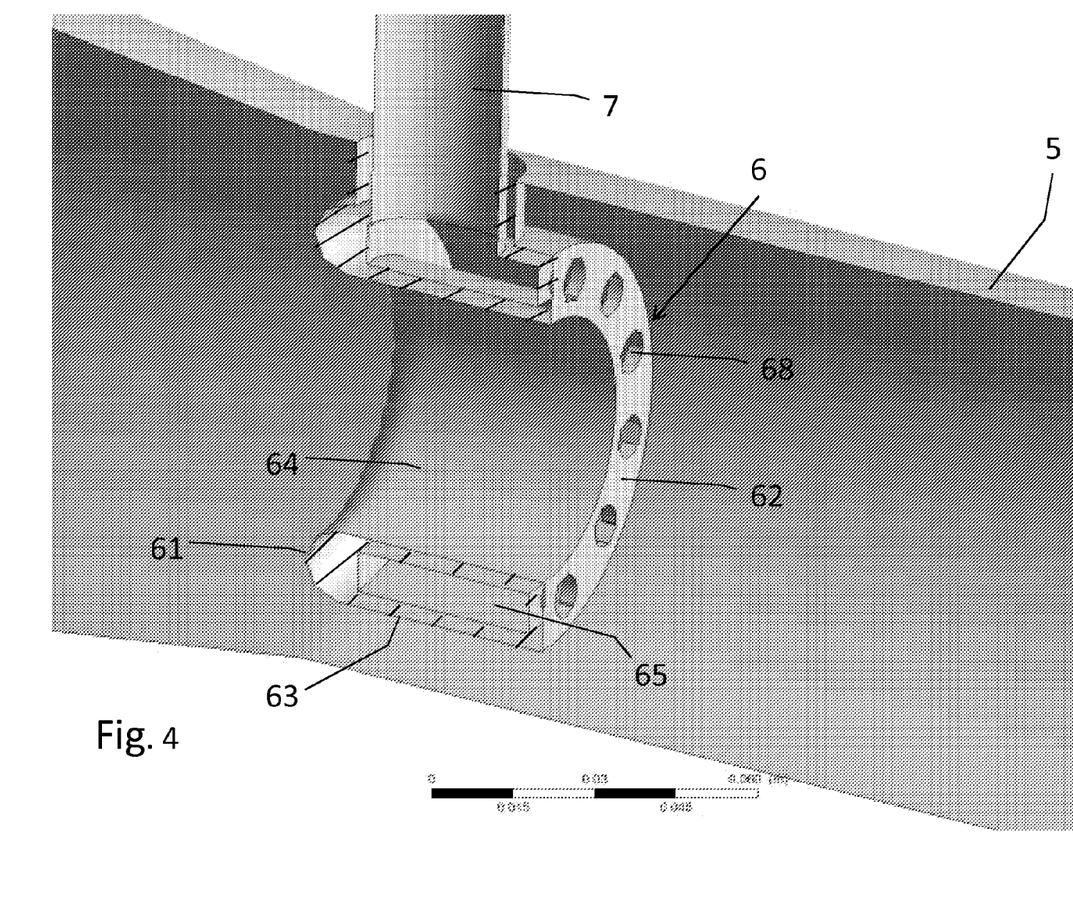
FIG. 4 depicts a perspective sectional view of a gas injector in the supply duct of FIG. 2.

Embodiments of the gas injector 4 are shown in more detail in FIGS. 2 to 4. The injector is mounted in a venturi section 5 having a smaller cross-sectional area than the supply duct 2. Tapered pipe sections 51, 52 interconnect the section of reduced diameter 53 to the supply duct. When a liquid mixture passes through the injector as indicated by arrow F, the reduction of the pipe diameter from a larger diameter D1 to a smaller diameter D2 in the venturi section causes an increase in flow velocity. In a typical flotation unit the velocity will increase from approximately 4 m/s in the supply duct 2 upstream of the gas injector to approximately 8 m/s.

The injector 4 has an injector ring 6 and at this ring the available flow area is decreased even further leading to a further increase in velocity, such as to approximately 15 m/s. The ejector is an annular member with a smaller outer diameter D3 than the inner diameter D2 of the section of reduced diameter 53, and consequently the flow is divided in two sub-streams, one passing centrally through the ejector and the other passing outside around it in the annular space between the ejector and the inner wall of the pipe. The two sub-streams are joined into a common flow on the downstream side of the ejector, and this causes turbulence primarily in the area just behind the ejector where the turbulence contributes to a more even distribution of ejected gas bubbles.

The exact proportions of the ejector and pipe in relation to each other should be chosen to achieve the most appropriate division of the flow, particularly with regards to the resulting flow pattern. In the embodiment of FIG. 3 the annular ejector ring 6 has the outer diameter D3, which is approximately half the inner diameter D2 of the pipe section 53, and in FIGS. 4 and 5 the outer diameter D3 corresponds to approximately three quarters of the inner pipe diameter D2.

The distance between the inner wall of the venturi section and the ejector may vary depending among others on the composition of the mixture to be separated, but the ejector may preferably be located such that the gas is ejected at a distance in the interval of ⅙ to ⅖ of the diameter D2 of the venturi section from the inner wall of the venturi section. For this, the ejector may have gas outlets 68 arranged at a diameter corresponding approximately to half the inner diameter of the venturi section. Other arrangements may of course be employed, such as arranging the outlets along a radius of about 30 to 35% of the diameter D2.

The injector ring is mounted to the pipe of gas inlet 7. It is possible to use a gas inlet of such a length that the ejector is located centrally in (coaxial with) the venturi section. Due to gravity the gas supplied to the flow has a tendency to rise towards the upper area of the supply duct. In order to counteract this effect of gravity it is alternatively possible to mount the ejector offset a distance downwards in relation to the cross-sectional area of the venturi section so that the distance between the outer side of the ejector and the inside surface of the venturi section is larger at the gas inlet to the annular chamber than at the opposite side of the injector. When the gas inlet enters from above the distance between the outer side of the ejector and the inside surface of the venturi section is smaller at the bottom than at the top of the ejector.

As may be seen from FIG. 2, the gas inlet 7 may optionally be shaped with diminishing cross-sectional area where the last section of the inlet has a diameter D4, which is approximately half the diameter D5 of the preceding pipe section. The CFU is dimensioned to the expected flow at the installation site. As an example, in a CFU for purification of water the last section of the gas inlet may have a diameter of approximately 20 mm, and the inner diameter D2 of the venturi section may be approximately 100 mm and the diameter of the supply duct may be approximately 150 mm.

In FIGS. 3 and 4 the ejector 6 is illustrated as being of a substantially circular shape and with a substantially constant width. This is preferred due to the structural simplicity, but it is to be understood that variations may be employed. Likewise, the pipes used for the venturi section as well as the supply duct need not be of a circular cross-section, but this will usually be preferred.

Figure 5:
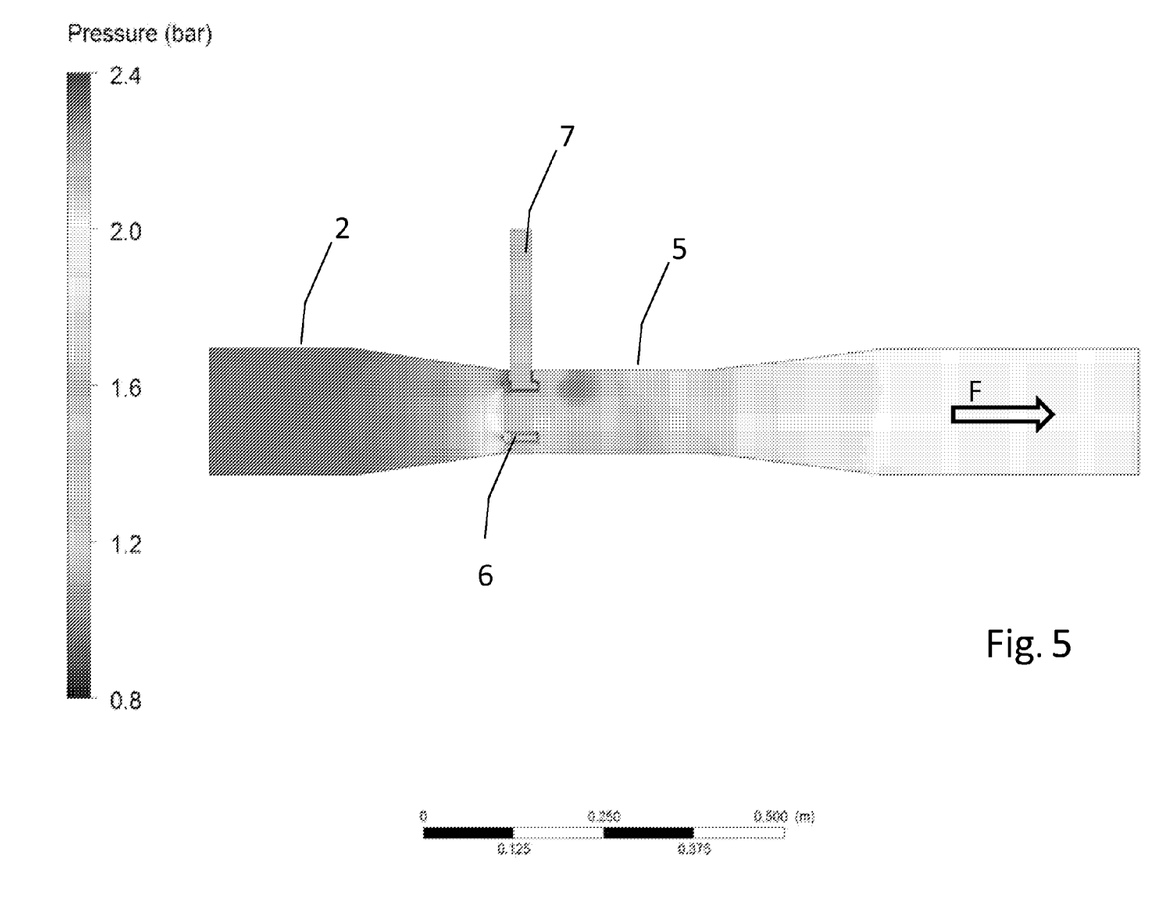
FIG. 5 is a sectional view of a gas injector according to the invention showing the pressure in different parts of the injector and supply duct during operation.

Upstream side 61 of the ejector ring 6 is depicted with a convex shape so as to cause a smooth deflection of the flow and thus a minimum of turbulence in the injector. A similar effect can be achieved with a pointed configuration. The shape of downstream side 62 of the ejector ring is typically flat as depicted in FIG. 5. Outer side 63 and inner side 64 of the ejector ring should preferably be smooth.

A gas distribution chamber 65 is located inside the ejector ring as is most clearly seen in FIG. 4. In this embodiment the ejector is made of metal, preferably steel, but it may also be of other materials, such as moulded from a plastics material.

The gas is ejected through the outlet openings 68 in the downstream side 62 of the ejector, said openings being in fluid communication with the gas distribution chamber 65. The number of openings may vary depending on their size and shape, depicted examples being the 12 and 18 openings shown in FIGS. 3 and 4, respectively.

Regardless of the design chosen it is considered advantageous that the total opening area corresponds substantially to the cross sectional area of the gas inlet where it joins the gas distribution chamber. Moreover, the outlets should be of such a size that clogging is essentially prevented. When using substantially circular openings a diameter of 2 mm is presently considered to constitute a lower limit for systems ejecting gas into water contaminated with oil. Choosing outlet openings, which have substantially the same width as the gas distribution chamber also minimizes clogging problems and turbulence within the gas distribution chamber.

Circular openings are easy to make and relatively resistant to clogging due to their simple geometry, but more complex shapes may be preferred for other reasons. An example is illustrated in FIG. 4, where the outlets openings 68 are shaped as circles superimposed by rectangles. The longer sides of the rectangles are approximately equal to the diameter of the circle, so that the corners project and resemble lugs on a pot, and arranged in parallel to a radii of the ejector. The shorter sides are parallel to a tangent to the gas distribution chamber and substantially coincident with the inner sides of the walls of the gas distribution chamber.

In this, the outlet openings are illustrated as being distributed evenly along the side of the ejector, but they may also be arranged unevenly with more outlets on the bottom half of the ejector than on the top half, in order to let out more gas at the bottom. This will make the gas stay longer in the water before reaching the top of the pipe.

As may be seen in FIG. 5 the pressure is relatively low directly behind ejector ring 6 seen in the direction F of the flow, particularly in the upper half of the pipe. This means that the gas will in effect be sucked from the openings, when these are arranged in the downstream side as described above.

To enhance the underpressure on the downstream side 62 of the ejector the joint with the inner and outer sides 63, 64 should preferably be sharp-edged.

In this, the outlet openings are described as being located on the downstream side as this is currently considered advantages, but a similar effect may, however, also be achieved with outlets arranged on one of the other sides of the ejector. Such solutions are, however, generally more complex and thus more prone to clogging.

The use of simple openings serving as the gas outlets leads to a very reliable system, which is resistant to clogging, but it is also possible to use one or more nozzles.

Figure 6:
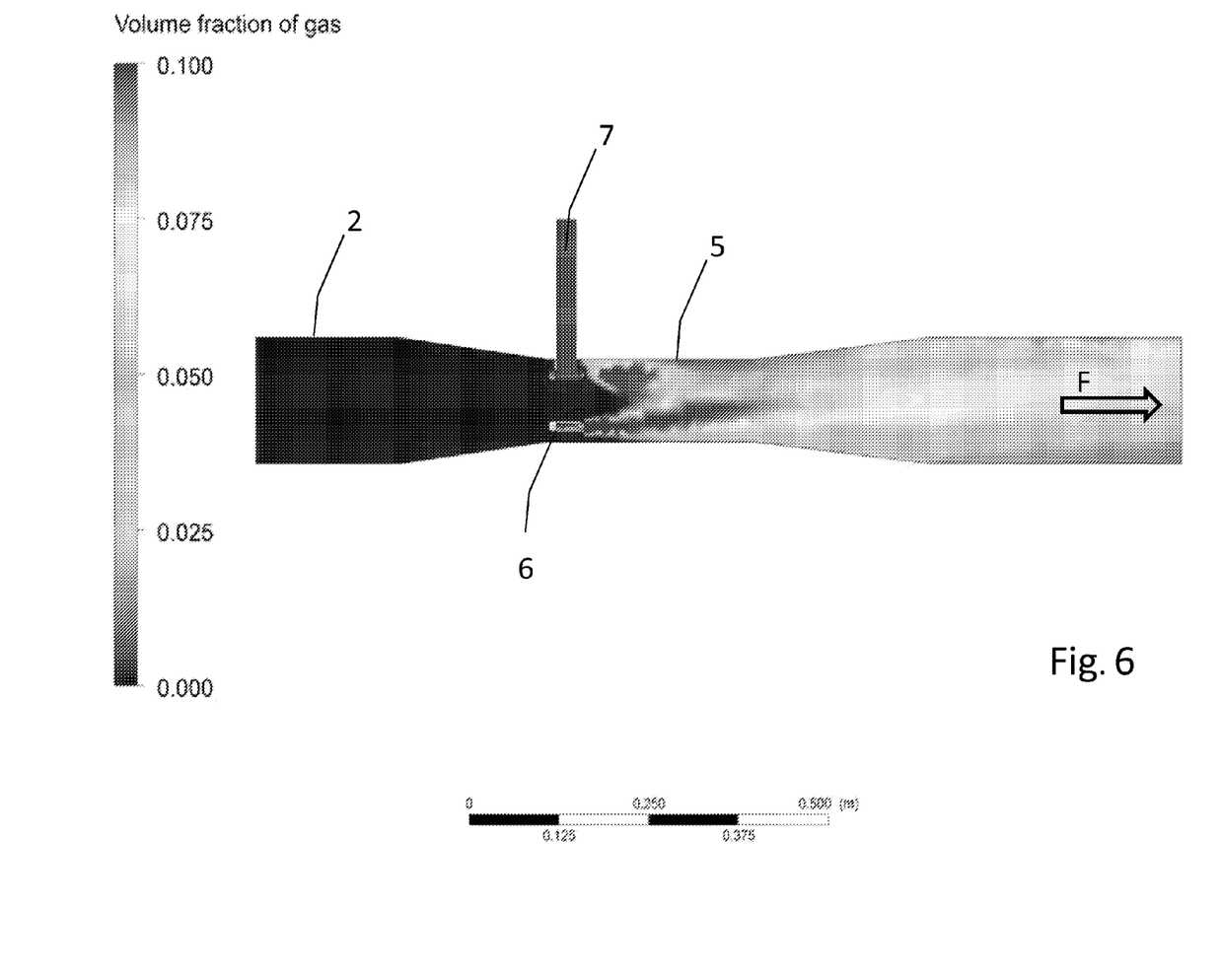
FIG. 6 is a view corresponding to FIG. 5 and showing the volume fraction of gas in different parts of the injector and supply duct during operation.

FIG. 6 illustrates that the annular ring and the sub-division of flows that united on the downstream side of the ejector ring 6 are very effective to provide a finely distributed and relatively uniform distribution of the gas within the liquid prior to reaching the tank inlet 11. In the embodiment shown, the distance between the ejector 6 and the tank inlet 11 is preferably about five and a half times the diameter D1 of the supply duct.

When using a recirculation conduit 3 connected to the tank gas outlet 12 as shown in FIG. 1 a suction pressure at the gas outlets 68 may propagate via the conduit and gas may then automatically be extracted from the tank 1. The flotation unit may thus be able to operate without the need for a gas pump in pipe 3 and, depending on the liquid mixture processed, possibly also without the need for an external supply of gas.

The gas may be any gas suitable to facilitate the separation of water, oil and gas in a mixture, examples being nitrogen, hydrogen, natural gas, carbon dioxide and mixtures thereof. Natural gas is normally the gas that may be extracted from an oil well and by using this, the flotation unit may be operated in a simple and cost-effective manner. For the purification of oil contaminated water according to the invention, natural gas may be injected in a volume corresponding to 5% of the volume of the liquid mixture.

The amount of gas injected may vary, but for use in purifying water at oil fields, it will usually be in the range of 0.01-1.9 $Sm^3$ per 1 $m^3$ oil contaminated water. In connection with the present invention the dimension $Sm^3$ is used as the volumetric unit of gas injected in relation to the volume of liquid. $Sm^3$ is standard cubic meters of the gaseous medium, a standardised unit within the offshore field, and corresponds to the volume of dry gas at 15.6° C. and a pressure of 101.325 kPa.

In addition to the components described above, means such as pumps, valves, pressure-sensors, collecting vessels for oil and gas etc. may form part of a flotation unit according to the invention.

As the gas injector is located in the supply duct, which is normally accessible in the installed state of a flotation unit, it will be relatively easy to convert existing prior art flotation units into flotation units according to the invention. Thus the benefit of the present invention can be applied on flotation units already installed and in use.

The flotation unit and the method according to the present invention can be modified within the scope of the appended patent claims. Details of the various embodiments can be combined into new embodiments within the scope of the patent claims. For example, the injector has been shown and described as being installed in an supply duct, which is substantially horizontal, but when used with a flotation unit located where only little space is available, the supply duct may extend from above down through the separator tank to the inlet. In such cases the injector may be installed in a section of the supply duct located within the vessel so that a very compact design is obtained. Moreover, it is evident that two or more of the flotation unit according to the invention may combined in any desired arrangement, e.g. in series and/or in parallel.

The invention claimed is:

1. A flotation unit for purifying water, such as a CFU (compact flotation unit), comprising at least a separator tank, a supply duct to a tank inlet, two or more outlets for gas, oil, and water from the separator tank, and a gas injector located in the supply duct, the gas injector comprising:
   a venturi section having an inner diameter and a cross-sectional area smaller than a cross-sectional area of the supply duct,
   an ejector arranged in the venturi section along the inner diameter and having an outer side facing an inside surface of the venturi section, an inner side facing a longitudinal center axis of the venturi section, a downstream side, and a upstream side, the ejector comprising an annular gas distribution chamber and a plurality of gas outlets arranged along a side of the ejector and connected to the gas distribution chamber, and a gas inlet for supplying gas to the gas distribution chamber,
   wherein the ejector has an outer diameter which is smaller than the inner diameter of the venturi section and the gas outlets are arranged in the downstream side of the ejector.

2. The flotation unit according to claim 1, wherein the ejector and the venturi section have circular cross-sectional shapes.

3. The flotation unit according to claim 1, wherein the upstream side of the ejector is convex.

4. The flotation unit according to claim 1, wherein the ejector has sharp edges where the downstream side meets the inner and outer sides.

5. The floatation unit according to claim 1, wherein the ejector is offset in relation to the cross-sectional area of the venturi section so that the distance between the outer side of the ejector and the inner surface of the venturi section is larger at the gas inlet to the annular chamber than at the side of the ejector opposite the gas inlet.

6. The flotation unit according to claim 1 wherein the gas outlets are arranged unevenly along the surface of the ejector with a larger area of gas outlets distant from the gas inlet than proximate the gas inlet.

7. The flotation unit according to claim 1, wherein the gas outlets are substantially circular openings in the ejector surface and have an individual diameter in the range of 2 to 8 mm.

8. The flotation unit according to claim 1, wherein at least one individual gas outlet of the gas outlets is shaped as a circle superimposed by a rectangle, which rectangular shape portion of the gas outlet has longer sides equal to or slightly larger than a diameter of the circular portion and shorter sides parallel to a tangent to the gas distribution chamber.

9. The flotation unit according to claim 1, wherein the gas outlets have a total opening area being equal to a cross-sectional flow area of the gas inlet.

10. The flotation unit according to claim 1, wherein the injector is spaced apart from the tank such that the gas outlets of the ejector are located at a distance of 1 to 10 times the inner diameter of the supply duct from the tank inlet.

11. The flotation unit according to claim 1, further comprising a recirculation conduit connecting a tank gas outlet with the gas inlet of the injector.

* * * * *